United States Patent
Tseng

(10) Patent No.: US 9,979,514 B2
(45) Date of Patent: May 22, 2018

(54) METHOD AND APPARATUS FOR HANDLING HARQ PROCESS OF SEMI-PERSISTENT SCHEDULING

(75) Inventor: Li-Chih Tseng, Taipei (TW)

(73) Assignee: INNOVATIVE SONIC LIMITED, Ebene (MU)

( * ) Notice: Subject to any disclaimer, the term of this patent is extended or adjusted under 35 U.S.C. 154(b) by 1347 days.

(21) Appl. No.: 12/546,708

(22) Filed: Aug. 25, 2009

(65) Prior Publication Data
US 2010/0058135 A1    Mar. 4, 2010

Related U.S. Application Data

(60) Provisional application No. 61/092,064, filed on Aug. 27, 2008.

(51) Int. Cl.
| | | |
|---|---|---|
| G08C 25/02 | (2006.01) | |
| H04L 1/18 | (2006.01) | |
| H04W 88/02 | (2009.01) | |

(52) U.S. Cl.
CPC .......... *H04L 1/1887* (2013.01); *H04L 1/1812* (2013.01); *H04L 1/1835* (2013.01); *H04W 88/02* (2013.01)

(58) Field of Classification Search
CPC ... H04L 1/1809; H04L 1/1812; H04L 1/1887; H04L 1/1819; H04L 1/188
USPC .......................................................... 714/748
See application file for complete search history.

(56) References Cited

U.S. PATENT DOCUMENTS

| | | | |
|---|---|---|---|
| 8,429,480 B2* | 4/2013 | Wang et al. .................. 714/751 |
| RE44,203 E * | 5/2013 | Chun .................... H04W 72/04 370/395.4 |
| 8,812,925 B2* | 8/2014 | Chun et al. .................... 714/748 |
| 2007/0079207 A1* | 4/2007 | Seidel .................. H04L 1/1845 714/748 |
| 2007/0115894 A1* | 5/2007 | Herrmann et al. ........... 370/338 |

(Continued)

FOREIGN PATENT DOCUMENTS

| | | | |
|---|---|---|---|
| EP | 2112845 A1 * | 10/2009 | |
| EP | 2112845 A1 * | 10/2009 | .......... H04W 72/042 |

(Continued)

OTHER PUBLICATIONS

Notice of Allowance on corresponding foreign Patent Application (KR 10-2009-0080052) dated Oct. 28, 2011.

(Continued)

*Primary Examiner* — Albert Decady
*Assistant Examiner* — Enam Ahmed
(74) *Attorney, Agent, or Firm* — Blue Capital Law Firm, P.C.

(57) ABSTRACT

A method of handling a hybrid automatic repeat request (HARQ) process for semi-persistent scheduling (SPS) in a user equipment (UE) of a wireless communication system is disclosed. The method includes steps of configuring an SPS functionality which utilizes at least one HARQ process; receiving a first new data indicator (NDI) addressed to an SPS cell radio network temporary identifier (SPS C-RNTI) of the UE for a first HARQ process of the at least one HARQ process; and considering the next transmission to be received by the first HARQ Process as a first transmission of the first HARQ Process when receiving a second NDI addressed to a C-RNTI of the UE for the first HARQ process.

12 Claims, 10 Drawing Sheets

(56) References Cited

U.S. PATENT DOCUMENTS

| | | | | |
|---|---|---|---|---|
| 2007/0189282 | A1* | 8/2007 | Lohr | H04B 7/022 370/370 |
| 2009/0103500 | A1* | 4/2009 | Malkamaki | H04L 1/1812 370/336 |
| 2010/0002630 | A1* | 1/2010 | Park | H04L 1/1812 370/328 |
| 2010/0042886 | A1* | 2/2010 | Kim | H04W 72/042 714/748 |
| 2010/0118807 | A1* | 5/2010 | Seo | H04W 72/042 370/329 |
| 2010/0325503 | A1* | 12/2010 | Womack | H04L 1/1825 714/748 |
| 2011/0093756 | A1* | 4/2011 | Yang et al. | 714/748 |
| 2011/0099447 | A1* | 4/2011 | Park et al. | 714/748 |
| 2011/0182245 | A1* | 7/2011 | Malkamaki et al. | 370/329 |
| 2011/0246846 | A1* | 10/2011 | Ojala et al. | 714/748 |

FOREIGN PATENT DOCUMENTS

| | | | |
|---|---|---|---|
| EP | 2166804 | A1 * | 3/2010 |
| JP | 2007531341 | A | 11/2007 |
| KR | 1020050059305 | A | 6/2005 |
| KR | 1020080041101 | A | 5/2008 |
| TW | 201034494 | A1 | 9/2010 |

OTHER PUBLICATIONS

Email Rapporteur: "Summary of the email discussion on remaining issues on Semi Persistent Scheduling" 3GPP TSG-RAN WG2 #63, Tdoc R2-083900, pp. 1-5, Aug. 18-22, 2008, XP050319091.

Ericsson: "Open issues in Semi Persistent Scheduling" 3GPP TSG-RAN WG2 #64, Tdoc R2-086175, pp. 1-3, Nov. 10-14, 2008, XP050321213.

Panasonic: "Remaining issues on Persistent scheduling" 3GPP TSG RAN WG2 #62bis, R2-083311 derived from R2-082228 and R2-082229, Jun. 30-Jul. 4, 2008, XP050140723.

R2-084861, 3GPP TSG-RAN WG2, Aug. 2008.

Draft R2-084875, Aug. 2008.

Office Action on corresponding foreign application (JP 2009-194388) from JPO dated Feb. 21, 2012.

Office Action on corresponding foreign Patent Application (TW 098126788) dated Nov. 6, 2012.

* cited by examiner

METHOD AND APPARATUS FOR HANDLING HARQ PROCESS OF SEMI-PERSISTENT SCHEDULING

CROSS REFERENCE TO RELATED APPLICATIONS

This application claims the benefit of U.S. Provisional Application No. 61/092,064, filed on Aug. 27, 2008 and entitled "HARQ operation for Semi-Persistent Scheduling", the contents of which are incorporated herein by reference.

BACKGROUND OF THE INVENTION

1. Field of the Invention

The present invention relates to a method and apparatus of handling hybrid automatic repeat request (HARQ) operation for semi-persistent scheduling (SPS), and more particularly, to a method and apparatus of handling HARQ operation for SPS in a user equipment (UE) of a wireless communication system, so as to avoid unexpected data combination.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

The LTE system has two scheduling methods: dynamic scheduling (DS) and semi-persistent scheduling (SPS). For DS, the network dynamically allocates resources to UEs for data reception or transmission depending on traffic volume, quality of service (QoS) requirements of each UE. And for SPS, the network periodically allocates resource to UEs, in order to serve upper layer applications which generate semi-static size data periodically, e.g. Voice over Internet Protocol (VoIP) services, for reducing control information sent on a physical downlink control channel (PDCCH) and enhancing system scheduling performance. In other words, SPS provides persistent transmission resources to the UE, such that the UE can perform periodic data transmission without monitoring PDCCH and make sure each periodic transmission is a new transmission.

The resources assigned by DS are addressed to a Cell Radio Network Temporary Identifier (C-RNTI) of the UE, while the resources assigned by SPS are addressed to an SPS C-RNTI of the UE. The SPS C-RNTI is a UE specific identity assigned by Radio Resource Control (RRC) layer, and is manly used for activating or modifying SPS resources and for indicating SPS retransmissions.

For DS, a UE recognizes that the assigned resource is for a new transmission or a retransmission by HARQ Process ID and New Data Indicator (NDI) included in the PDCCH signaling. If the value of NDI is different from a previous NDI of the same HARQ process, the assigned resource is for a new transmission. Conversely, if the value of NDI is the same as the previous NDI of the same HARQ process, then the assigned resource is for a retransmission.

However, the use of NDI in SPS is different from that in DS. For SPS, the value of NDI is used for indicating the UE the purpose of PDCCH signaling addressed to its SPS C-RNTI. If the value of NDI is 0, it means that the PDCCH signaling addressed to UE's SPS C-RNTI is used for activating or modifying SPS resources. Conversely, if the value of NDI is 1, then the PDCCH signaling addressed to SPS C-RNTI is used for allocating transmission recourse of an SPS retransmission.

According to current specifications, in downlink direction, one or more specific HARQ process ID(s) reserved for SPS is configured by RRC signaling, but in uplink direction, the HARQ process ID(s) reserved for SPS is recognized after configuring start time and cycle length of an SPS period. However, DS is also allowed to use the HARQ process ID(s) reserved for SPS both in downlink and uplink direction. In this situation, when a UE sequentially receives two NDIs of a same HARQ process which are included in a PDCCH signaling addressed to SPS C-RNTI and C-RNTI, respectively, since the meaning of NDI field are different for DS and SPS, comparing the two NDIs is meaningless, and may cause some unexpected data combination due to the comparison result.

For example, when the UE receives a PDCCH signaling addressed to its SPS C-RNTI, which indicates the UE to use some HARQ process, such as X to perform SPS retransmission, based on the above illustration, the value of NDI shall be 1. Next, the UE receives a PDCCH signaling addressed to its C-RNTI, which indicates the UE to use the HARQ process X to transmit data as well. In this case, the UE compares the DS NDI with the previous NDI of the HARQ process X, i.e. the SPS NDI. However, the meaning of SPS NDI is different from that of DS NDI. Thus, comparing the two NDIs is meaningless, and may cause some unexpected data combination due to the comparison result.

SUMMARY OF THE INVENTION

It is therefore an objective of the present invention to provide a method and apparatus of handling a hybrid automatic repeat request (HARQ) process for semi-persistent scheduling (SPS) in a user equipment (UE) of a wireless communication system.

According to the present invention, a method of handling a hybrid automatic repeat request (HARQ) process for semi-persistent scheduling (SPS) in a user equipment (UE) of a wireless communication system is disclosed. The method includes steps of configuring an SPS functionality, the SPS functionality utilizing at least one HARQ process; receiving a first new data indicator (NDI) addressed to an SPS cell radio network temporary identifier (SPS C-RNTI) of the UE for a first HARQ process of the at least one HARQ process; and considering a next transmission to be received by the first HARQ process as a first transmission of the first HARQ process when receiving a second NDI addressed to a C-RNTI of the UE for the first HARQ process.

According to the present invention, a communications device of handling a hybrid automatic repeat request (HARQ) process for semi-persistent scheduling (SPS) in a user equipment (UE) of a wireless communication system is disclosed. The communications device includes a processor for executing a program, and a memory, coupled to the processor, for storing the program. The program includes steps of configuring an SPS functionality, the SPS functionality utilizing at least one HARQ process; receiving a first new data indicator (NDI) addressed to an SPS cell radio network temporary identifier (SPS C-RNTI) of the UE for a first HARQ process of the at least one HARQ process; and considering a next transmission to be received by the first HARQ process as a first transmission of the first HARQ process when receiving a second NDI addressed to a C-RNTI of the UE for the first HARQ process.

According to the present invention, a method of handling a hybrid automatic repeat request (HARQ) process for semi-persistent scheduling (SPS) in a user equipment (UE) of a wireless communication system is disclosed. The method includes steps of configuring an SPS functionality, the SPS functionality utilizing at least one HARQ process; receiving a pre-assigned transmission by a first HARQ process of the at least one HARQ process according to configurations of the SPS functionality; and considering a next transmission to be received by the first HARQ process as a first transmission of the first HARQ process when receiving a new data indicator (NDI) addressed to a Cell Radio Network Temporary Identifier (C-RNTI) of the UE for the first HARQ process.

According to the present invention, a communications device of handling a hybrid automatic repeat request (HARQ) process for semi-persistent scheduling (SPS) in a user equipment (UE) of a wireless communication system is disclosed. The communications device includes a processor for executing a program, and a memory, coupled to the processor, for storing the program. The program includes steps of configuring an SPS functionality, the SPS functionality utilizing at least one HARQ process; receiving a pre-assigned transmission by a first HARQ process of the at least one HARQ process according to configurations of the SPS functionality; and considering a next transmission to be received by the first HARQ process as a first transmission of the first HARQ process when receiving a new data indicator (NDI) addressed to a Cell Radio Network Temporary Identifier (C-RNTI) of the UE for the first HARQ process.

According to the present invention, a method of handling a hybrid automatic repeat request (HARQ) process for semi-persistent scheduling (SPS) in a user equipment (UE) of a wireless communication system is disclosed. The method includes steps of configuring an SPS functionality, the SPS functionality utilizing at least one HARQ process; receiving a first New Data indicator (NDI) addressed to a cell radio network temporary identifier (C-RNTI) of the UE for a first HARQ process of the at least one HARQ process; and comparing the first NDI with a second NDI previously addressed to the C-RNTI for the first HARQ process to determine whether a transmission to be received by the first HARQ process is a new transmission; wherein the UE receives a third NDI addressed to an SPS C-RNTI of the UE for the first HARQ process or receives a pre-assigned transmission by the first HARQ process between reception of the first NDI and the second NDI.

According to the present invention, a communications device of handling a hybrid automatic repeat request (HARQ) process for semi-persistent scheduling (SPS) in a user equipment (UE) of a wireless communication system is disclosed. The communications device includes a processor for executing a program, and a memory, coupled to the processor, for storing the program. The program includes steps of configuring an SPS functionality, the SPS functionality utilizing at least one HARQ process; receiving a first New Data indicator (NDI) addressed to a cell radio network temporary identifier (C-RNTI) of the UE for a first HARQ process of the at least one HARQ process; and comparing the first NDI with a second NDI previously addressed to the C-RNTI for the first HARQ process to determine whether a transmission to be received by the first HARQ process is a new transmission; wherein the UE receives a third NDI addressed to an SPS C-RNTI of the UE for the first HARQ process or receives a pre-assigned transmission by the first HARQ process between reception of the first NDI and the second NDI.

According to the present invention, a method of handling a hybrid automatic repeat request (HARQ) process for semi-persistent scheduling (SPS) in a user equipment (UE) of a wireless communication system is disclosed. The method includes steps of configuring an SPS functionality, the SPS functionality utilizing at least one HARQ process; receiving a physical downlink control channel (PDCCH) signaling addressed to an SPS Cell Radio Network Temporary Identifier (SPS C-RNTI) of the UE, the PDCCH signaling indicating the UE to deactivate the SPS functionality; and flushing all HARQ buffers of the at least one HARQ process or considering all next transmission to be received by the at least one HARQ process as a first transmission.

According to the present invention, a communications device of handling a hybrid automatic repeat request (HARQ) process for semi-persistent scheduling (SPS) in a user equipment (UE) of a wireless communication system is disclosed. The communications device includes a processor for executing a program, and a memory, coupled to the processor, for storing the program. The program includes steps of configuring an SPS functionality, the SPS functionality utilizing at least one HARQ process; receiving a physical downlink control channel (PDCCH) signaling addressed to an SPS Cell Radio Network Temporary Identifier (SPS C-RNTI) of the UE, the PDCCH signaling indicating the UE to deactivate the SPS functionality; and flushing all HARQ buffers of the at least one HARQ process or considering all next transmission to be received by the at least one HARQ process as a first transmission.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
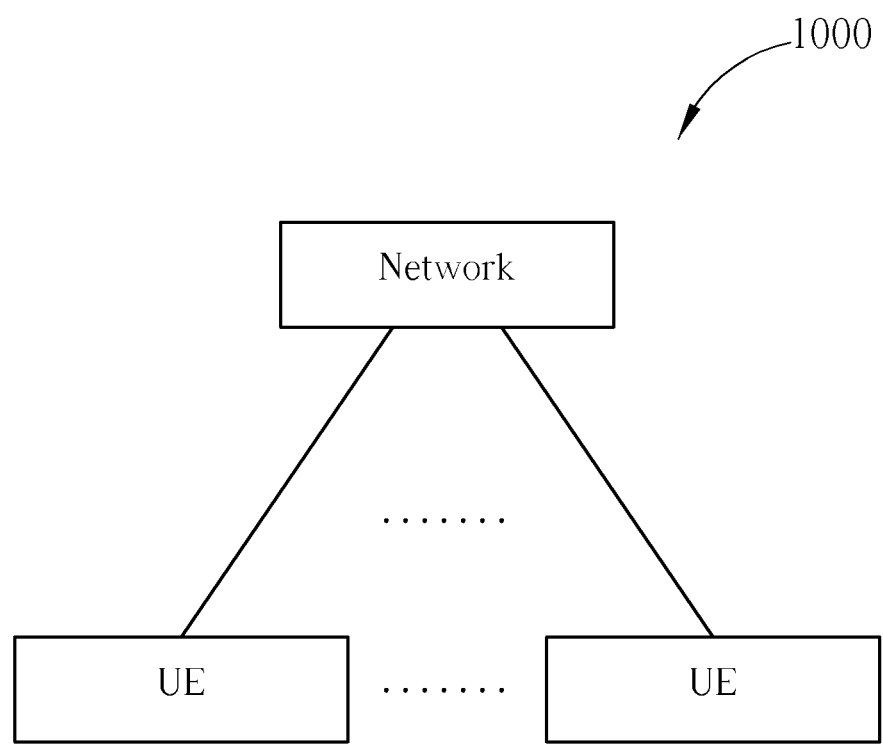
FIG. 1 is a schematic diagram of a wireless communications system.

Please refer to FIG. 1, which illustrates a schematic diagram of a wireless communications system 1000. The wireless communications system 1000 is preferred to be a Long Term Evolution (LTE) system, and is briefly composed of a network and a plurality of user equipments (UEs). In FIG. 1, the network and the UEs are simply utilized for illustrating the structure of the wireless communications system 1000. Practically, the network may comprise a plurality of base stations (Node Bs), radio network controllers and so on according to actual demands, and the UEs can be devices such as mobile phones, computer systems, etc.

Figure 2:
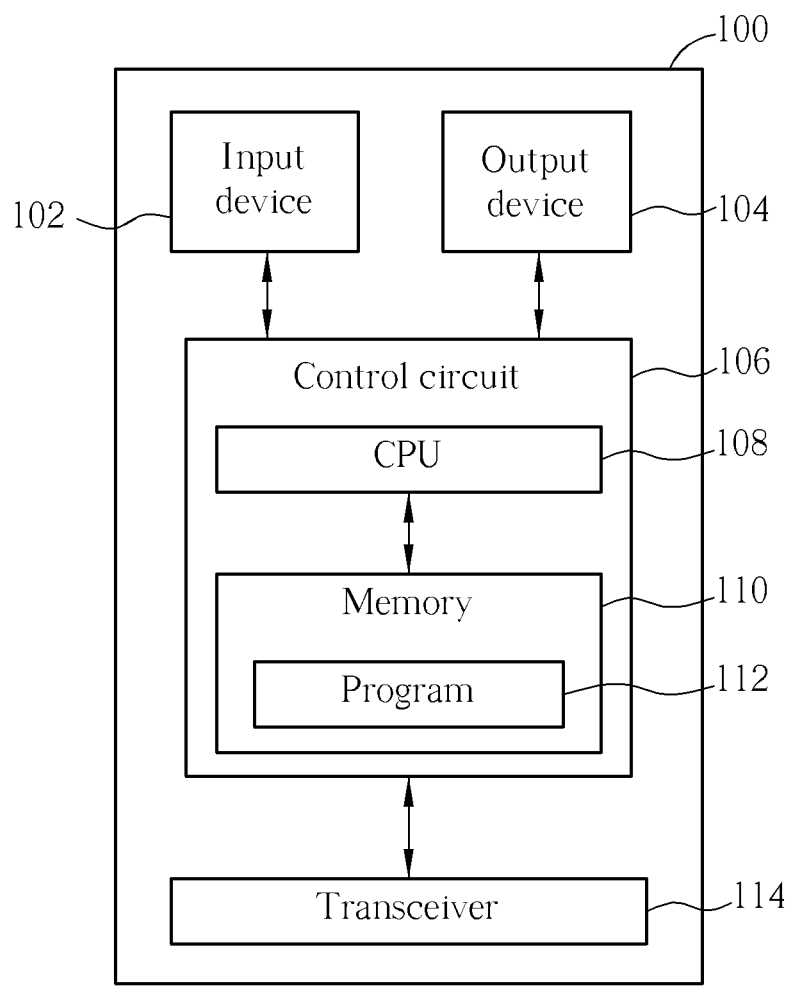
FIG. 2 is a function block diagram of a wireless communications device.

Please refer to FIG. 2, which is a functional block diagram of a communications device 100 in a wireless communications system. The communications device 100 can be utilized for realizing the UEs in FIG. 1, and the wireless communications system is preferably the LTE system. For the sake of brevity, FIG. 2 only shows an input device 102, an output device 104, a control circuit 106, a central processing unit (CPU) 108, a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 3:
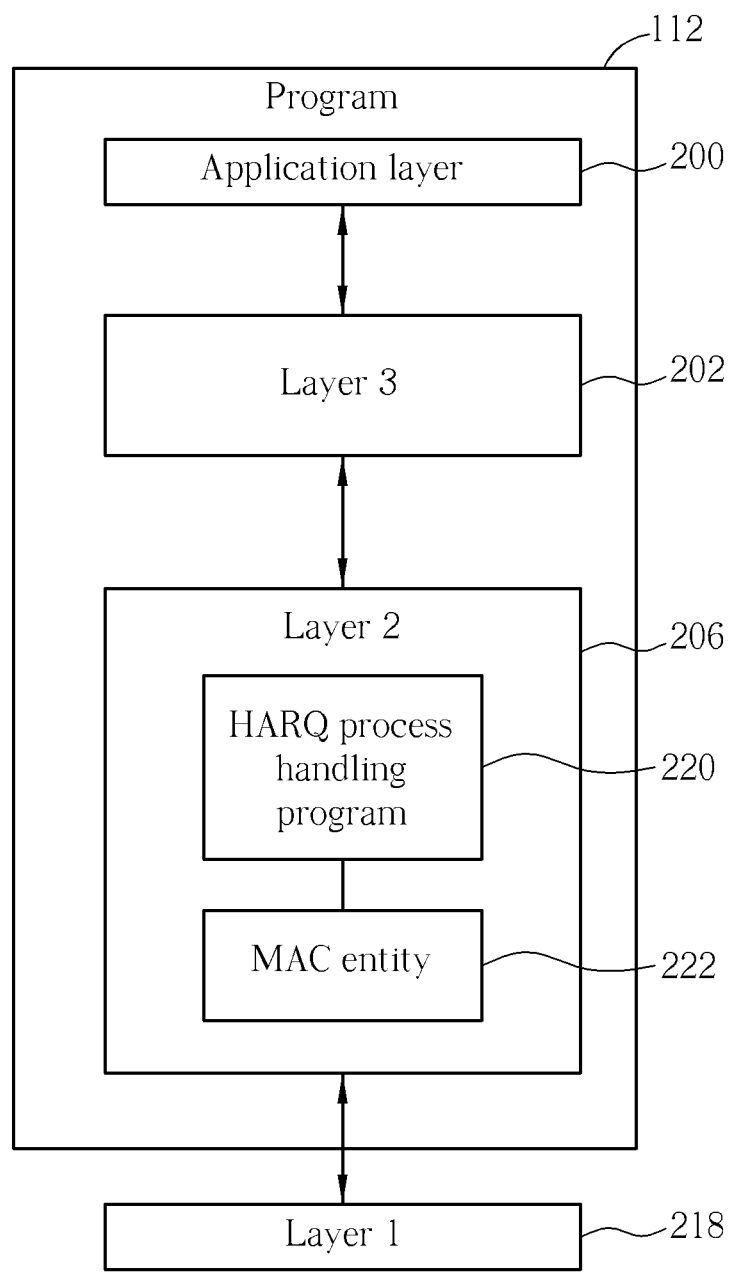
FIG. 3 is a diagram of program of FIG. 2.

Please continue to refer to FIG. 3. FIG. 3 is a schematic diagram of the program 112 shown in FIG. 2. The program 112 includes an application layer 200, a Layer 3 202, and a Layer 2 206, and is coupled to a Layer 1 218. The Layer 3 202 is used for performing resource control. The Layer 2 is used for performing link control. The Layer 1 218 is used for performing physical connection. A Medium Access Control (MAC) entity 222 is located at the Layer 2 206, which can perform a plurality of hybrid automatic repeat request (HARQ) processes to receive packets and support a Semi-Persistent Scheduling (SPS) functionality. When the MAC entity 222 activates the SPS functionality according to a Radio Resource Control (RRC) command of the Layer 3 202, the embodiment of the present invention provides an HARQ process handling program 220 in the program 112 for avoiding occurrence of unexpected data combination.

Figure 4:
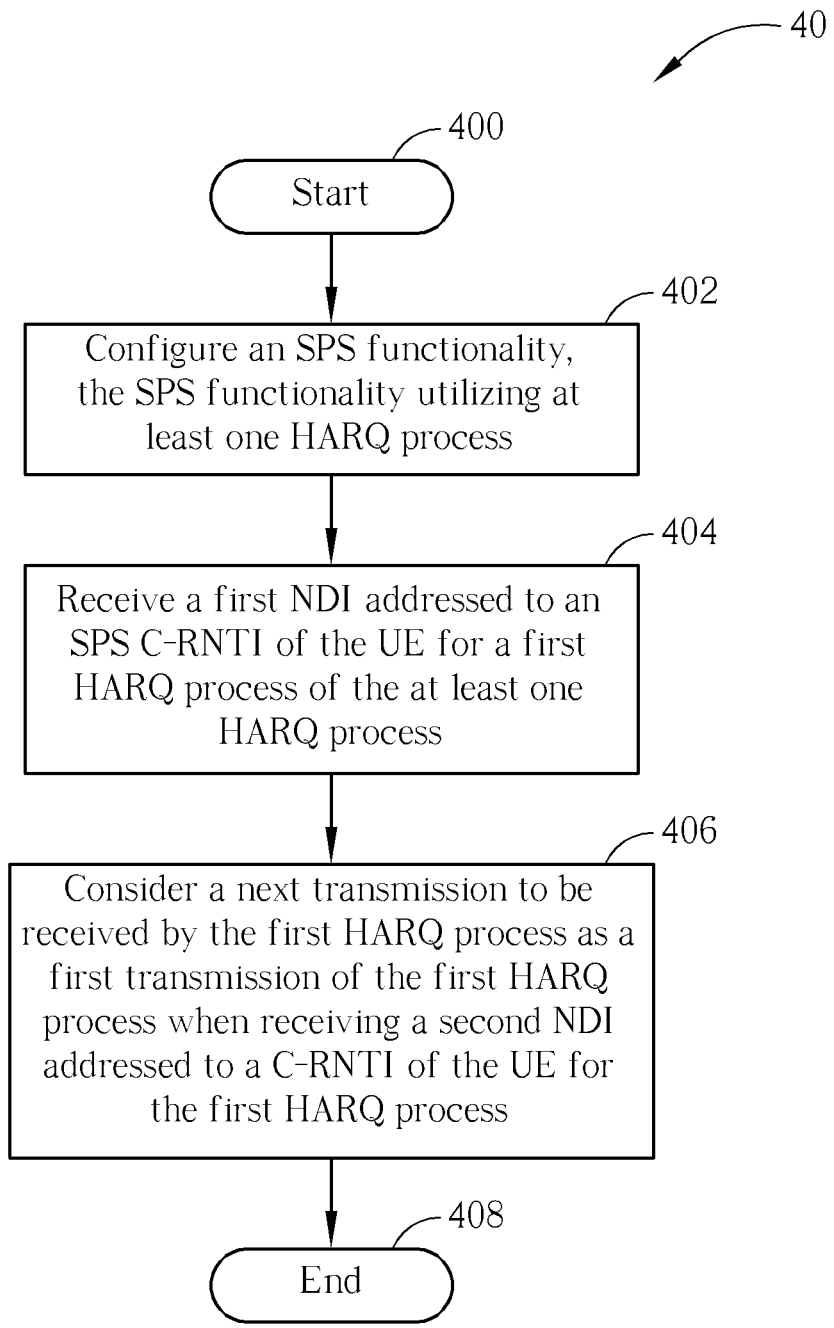
FIG. 4 is a flowchart of a process according to an embodiment of the present invention.

Please refer to FIG. 4, which illustrates a schematic diagram of a process 40 according to an embodiment of the present invention. The process 40 is utilized for handling an HARQ process for SPS in a UE of a wireless communication system and can be compiled into the HARQ process handling program 220. The process 40 includes the following steps:

Step 400: Start.

Step 402: Configure an SPS functionality, the SPS functionality utilizing at least one HARQ process.

Step 404: Receive a first new data indicator (NDI) addressed to an SPS cell radio network temporary identifier (SPS C-RNTI) of the UE for a first HARQ process of the at least one HARQ process.

Step 406: Consider a next transmission to be received by the first HARQ process as a first transmission of the first HARQ process when receiving a second NDI addressed to a C-RNTI of the UE for the first HARQ process.

Step 408: End.

According to the process 40, the embodiment of the present invention first configures the SPS functionality, which utilizes at least one HARQ process. Then, the UE receives the first NDI addressed to its SPS C-RNTI for the first HARQ process of the at least one HARQ process. When a second NDI addressed to the UE's C-RNTI for the first HARQ process is received, the UE shall consider a next transmission to be received by the first HARQ process as a first transmission of the first HARQ process.

As mentioned in the prior art, the network configures the SPS functionality such as HARQ process ID(s) reserved for SPS by RRC signaling. Besides, the resources assigned by dynamic scheduling (DS) are addressed to UE's C-RNTI, while the resources assigned by SPS are addressed to UE's SPS C-RNTI. The NDI sent by SPS, i.e. the NDI included in a PDCCH signaling addressed to UE's SPS C-RNTI is mainly used for the following two purposes: modification of SPS resources or indication of SPS retransmissions, which are well known by those skilled in the art and are not detailed herein.

Therefore, when the UE sequentially receives the first NDI and the second NDI for the same HARQ process, which are included in a PDCCH signaling addressed to its SPS C-RNTI and C-RNTI, respectively, the UE according to the embodiment of the present invention considers the transmission to be received by the HARQ process as a first transmission of the HARQ process.

Figure 5:
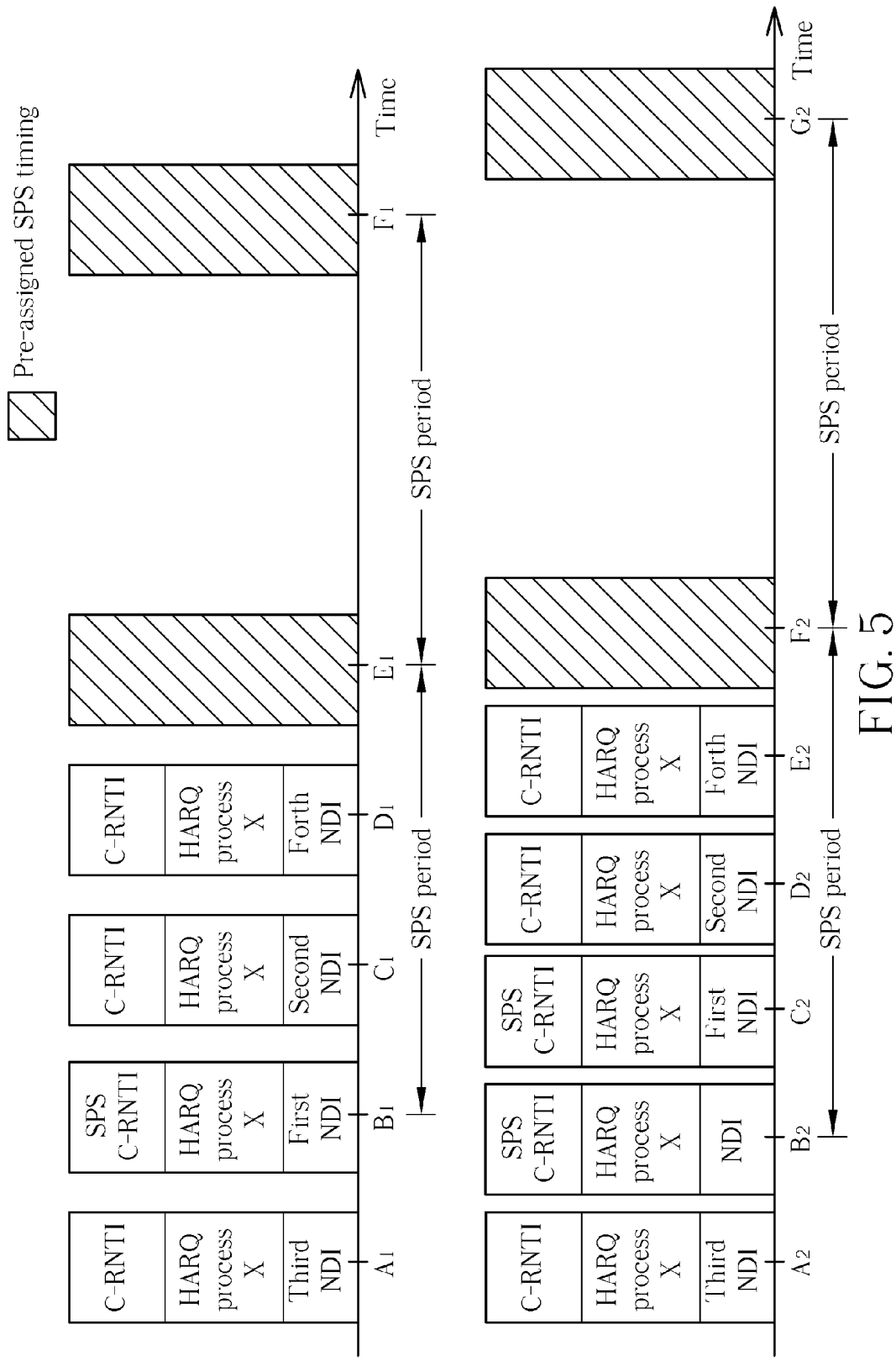
FIG. 5 is an exemplary illustration of the process in FIG. 4.

For example, please refer to FIG. 5. FIG. 5 is an exemplary illustration of the process 40. Assume that the first NDI addressed to SPS C-RNTI for an HARQ process x is received at a timing point B1, timing points E1 and F1 are pre-assigned timing for SPS, and the second NDI addressed to C-RNTI for the HARQ process x is received at a timing point C1. As mentioned above, the use of NDI in SPS is different from that in DS. Thus, the UE according to the embodiment of the present invention considers the transmission to be received by the HARQ process x at the timing point C1 as a first transmission of the HARQ process x. Besides, even the UE receives a third NDI addressed to its C-RNTI for the HARQ process x before the timing point B1, such as at a timing point A1, the UE according to the embodiment of the present invention also considers the transmission to be received by the HARQ process x at the timing point C1 as a first transmission (i.e. new transmission) of the HARQ process x. As a result, the embodiment of the present invention can avoid unexpected data combination due to incorrect NDI comparison results.

Please note that, if a forth NDI addressed to UE's C-RNTI for the HARQ process x is received at a timing point D1 after reception of the second NDI, since the second NDI and the forth NDI are both assigned by DS, the UE then compares the second NDI with the forth NDI to determine whether the transmission to be received by the HARQ process x at the timing point D1 is a new transmission. If the values of the second NDI and the forth NDI are the same, the transmission to be received by the HARQ process x is a retransmission; Otherwise, if the values of the second NDI and the forth NDI are toggled, the transmission to be received by the HARQ process x is a new transmission.

Similarly, please further refer to FIG. 5. Assume that the UE receives an NDI addressed to its SPS C-RNTI for the HARQ process X indicating SPS retransmission at a timing point B2. The first NDI addressed to SPS C-RNTI for the HARQ process x is received at a timing point C2, timing points F2 and G2 are pre-assigned timing for SPS, and the second NDI addressed to C-RNTI for the HARQ process x is received at a timing point D2. In this case, the UE according to the embodiment of the present invention also considers the transmission to be received by the HARQ process x at the timing point D2 as a first transmission of the HARQ process x. Besides, no matter whether the UE receives a third NDI addressed to its C-RNTI for the HARQ process x before the timing point B2, such as at a timing point A2, the UE according to the embodiment of the present invention still considers the transmission to be received by the HARQ process x at the timing point D2 as a first transmission (i.e. new transmission) of the HARQ process x. Note that, if a forth NDI addressed to UE's C-RNTI for the HARQ process x is received at a timing point E2 after reception of the second NDI, the UE then compares the second NDI with the forth NDI to determine whether the transmission to be received by the HARQ process x at the timing point E2 is a new transmission.

Figure 6:
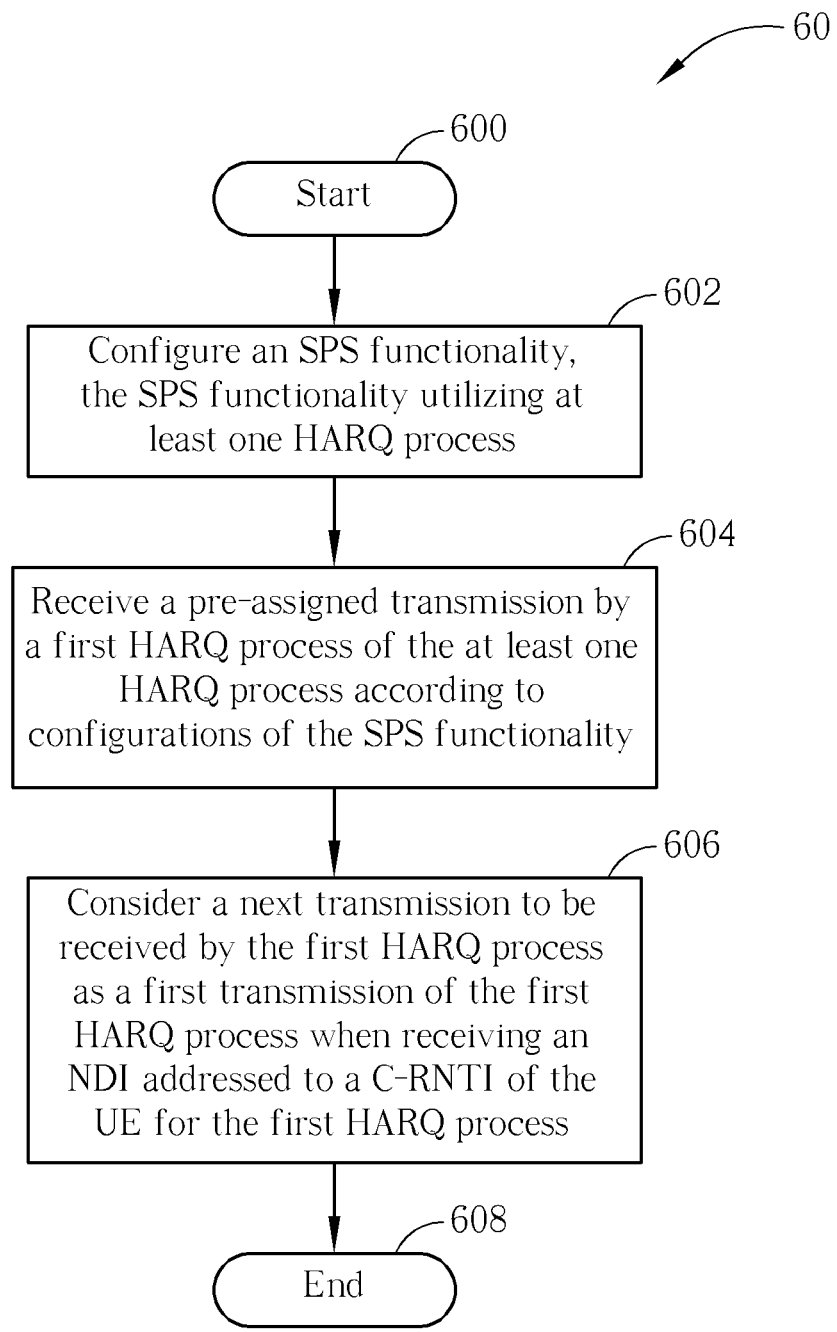
FIG. 6 is a flowchart of a process according to an embodiment of the present invention.

Please refer to FIG. 6, which illustrates a schematic diagram of a process 60 according to an embodiment of the present invention. The process 60 is utilized for handling an HARQ process for SPS in a UE of a wireless communication system and can be compiled into the HARQ process handling program 220. The process 60 includes the following steps:

Step 600: Start.

Step 602: Configure an SPS functionality, the SPS functionality utilizing at least one HARQ process.

Step 604: Receive a pre-assigned transmission by a first HARQ process of the at least one HARQ process according to configurations of the SPS functionality.

Step 606: Consider a next transmission to be received by the first HARQ process as a first transmission of the first HARQ process when receiving an NDI addressed to a C-RNTI of the UE for the first HARQ process.

Step 608: End.

According to the process 60, the embodiment of the present invention first configures the SPS functionality, which utilizes at least one HARQ process. Then, the UE receives the pre-assigned transmission by the first HARQ process of the at least one HARQ process according to the configurations of the SPS functionality. When the NDI addressed to UE's C-RNTI for the first HARQ process is received, the UE shall consider a next transmission to be received by the first HARQ process as a first transmission of the first HARQ process.

Figure 7:
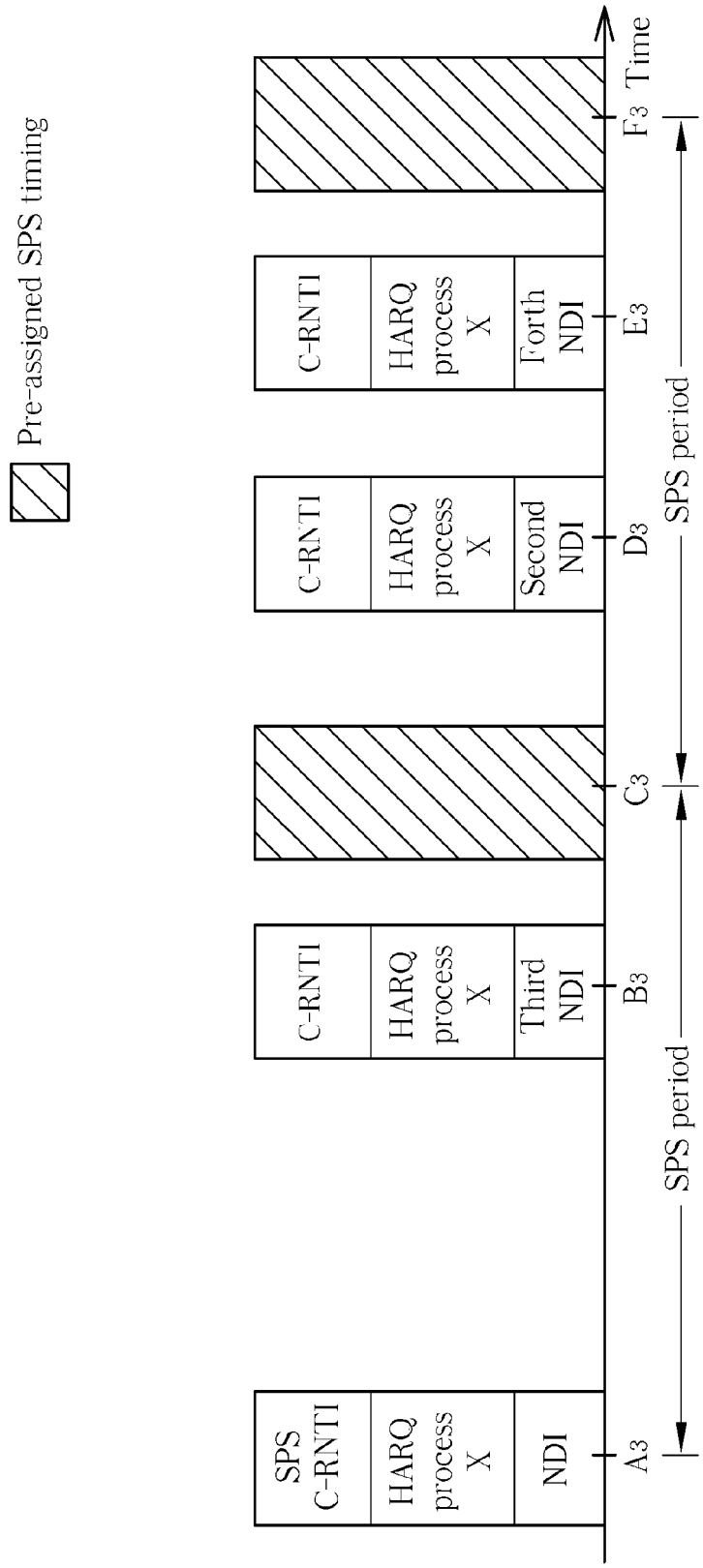
FIG. 7 is an exemplary illustration of the process in FIG. 6.

For example, please refer to FIG. 7. FIG. 7 is an exemplary illustration of the process 60. Assume that the pre-assigned SPS transmission is received by an HARQ process x according to the configurations of the SPS functionality at a timing point A3, and timing points C3 and F3 are pre-assigned timing reserved for SPS. When the second NDI addressed to UE's C-RNTI for the HARQ process x is received at a timing point D3, the UE according to the embodiment of the present invention considers the transmission to be received by the HARQ process x at the timing point D3 as a first transmission of the HARQ process x. Besides, no matter whether the UE receives a third NDI addressed to its C-RNTI for the HARQ process x before the timing point C3, such as at a timing point B3, the UE according to the embodiment of the present invention still considers the transmission to be received by the HARQ process x at the timing point D3 as a first transmission (i.e. new transmission) of the HARQ process x. Note that, if a forth NDI addressed to UE's C-RNTI for the HARQ process x is received at a timing point E3 after reception of the second NDI, the UE then compares the second NDI with the forth NDI to determine whether the transmission to be received by the HARQ process x at the timing point E3 is a new transmission.

Figure 8:
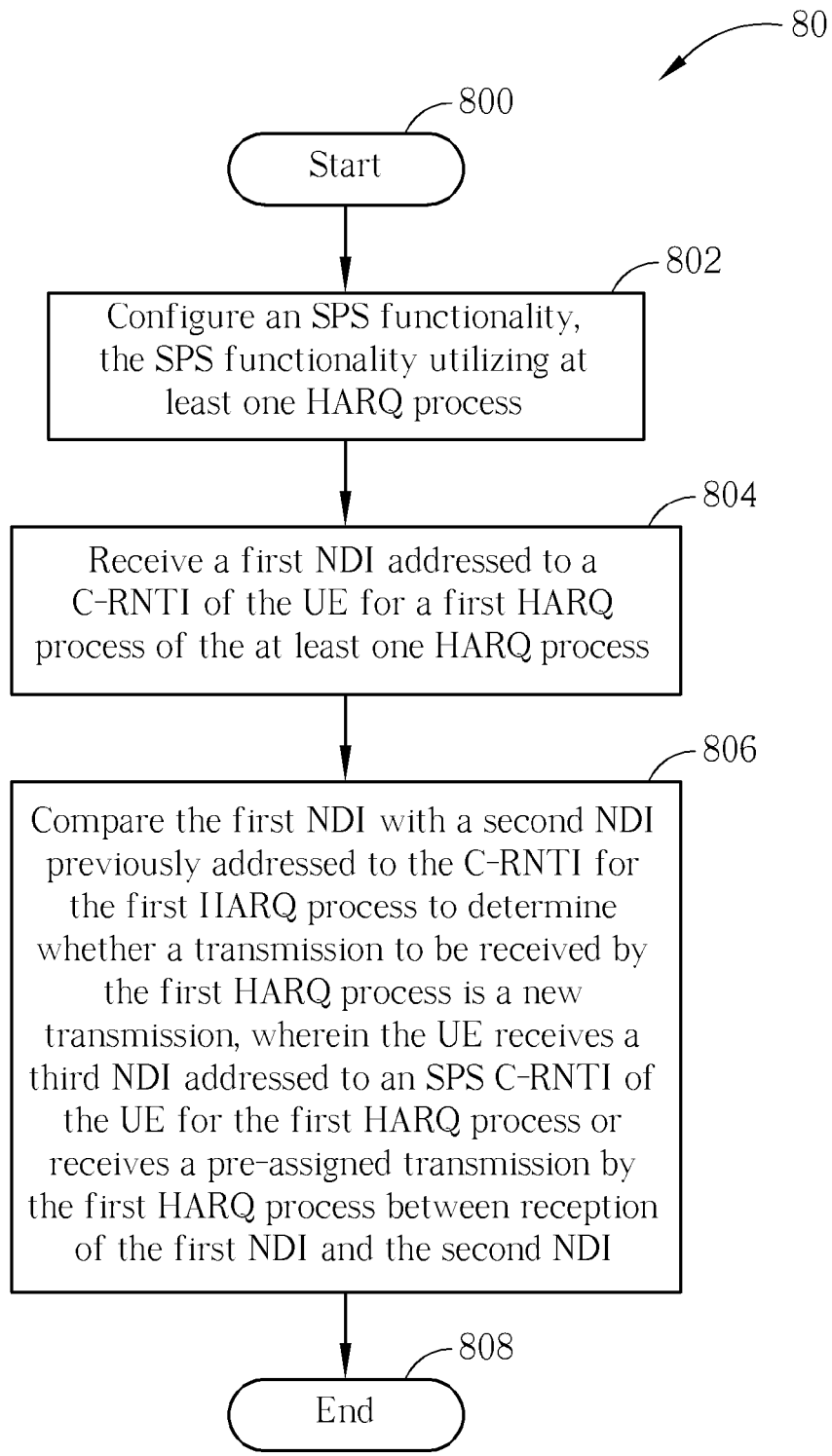
FIG. 8 is a flowchart of a process according to an embodiment of the present invention.

Please refer to FIG. 8, which illustrates a schematic diagram of a process 80 according to an embodiment of the present invention. The process 80 is utilized for handling an HARQ process for SPS in a UE of a wireless communication system and can be compiled into the HARQ process handling program 220. The process 80 includes the following steps:

Step 800: Start.

Step 802: Configure an SPS functionality, the SPS functionality utilizing at least one HARQ process.

Step 804: Receive a first NDI addressed to a C-RNTI of the UE for a first HARQ process of the at least one HARQ process.

Step 806: Compare the first NDI with a second NDI previously addressed to the C-RNTI for the first HARQ process to determine whether a transmission to be received by the first HARQ process is a new transmission, wherein the UE receives a third NDI addressed to an SPS C-RNTI of the UE for the first HARQ process or receives a pre-assigned transmission by the first HARQ process between reception of the first NDI and the second NDI.

Step 808: End.

According to the process 80, the embodiment of the present invention first configures the SPS functionality, which utilizes at least one HARQ process. Then, the UE receives the first NDI addressed to its C-RNTI for the first HARQ process of the at least one HARQ process. Finally, the UE compares the first NDI with a second NDI previously addressed to the C-RNTI for the first HARQ process to determine whether a transmission to be received by the first HARQ process is a new transmission. It is noted that the UE receives a third NDI addressed to its SPS C-RNTI for the first HARQ process or receives a pre-assigned SPS transmission by the first HARQ process between reception of the first NDI and the second NDI.

Figure 9:
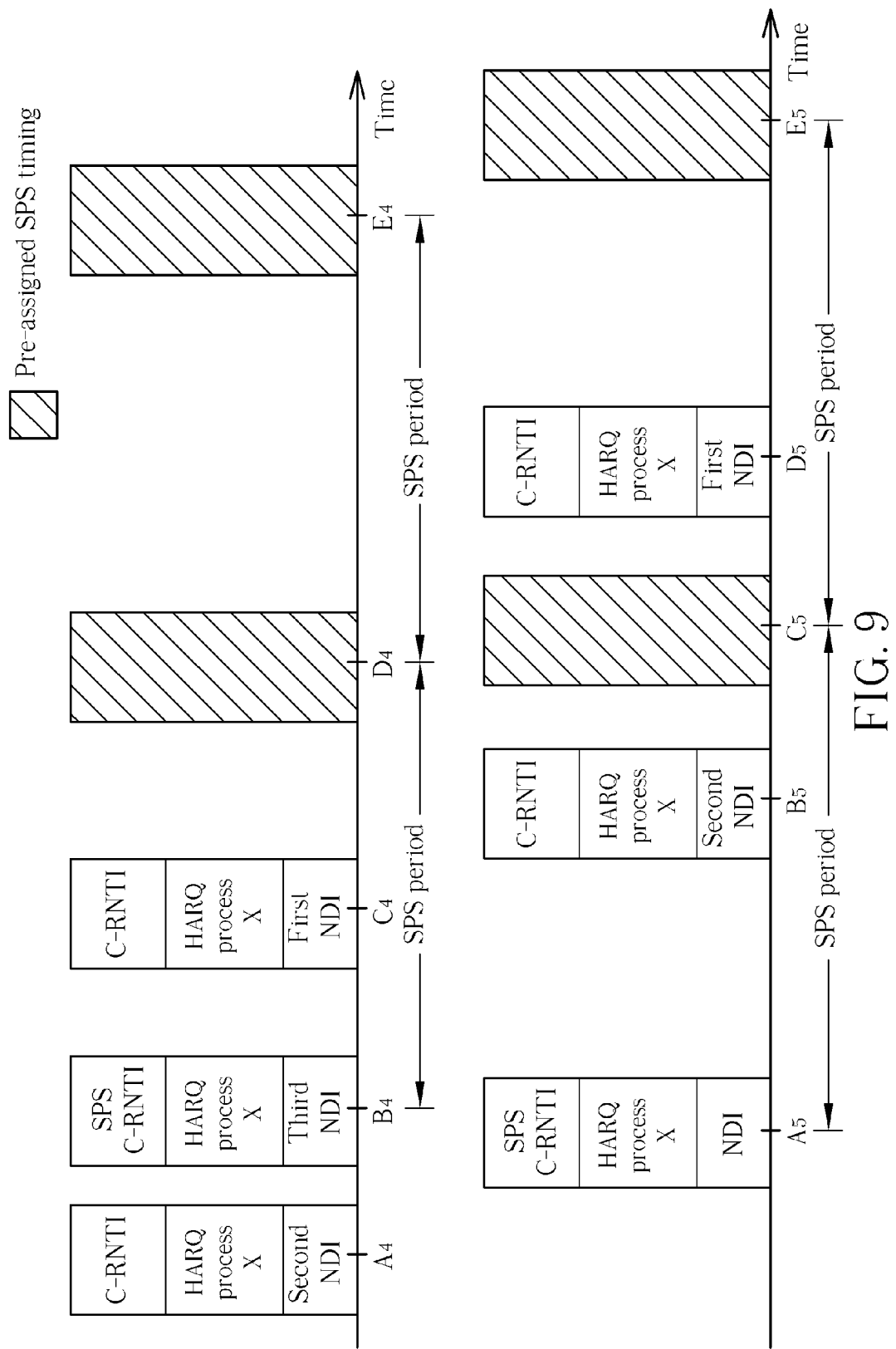
FIG. 9 is an exemplary illustration of the process in FIG. 8.

For example, please refer to FIG. 9. FIG. 9 is an exemplary illustration of the process 80. Assume that the third NDI addressed to UE's SPS C-RNTI for an HARQ process x is received at a timing point B4, and timing points D4 and E4 are pre-assigned timing reserved for SPS. When the first NDI addressed to UE's C-RNTI for the HARQ process x is received at a timing point C4, the UE according to the embodiment of the present invention compares the first NDI with the second NDI previously addressed to its C-RNTI for the HARQ process x (e.g. at a timing point A4) to determine whether the transmission to be received by the HARQ process x is a new transmission. If the values of the first NDI and the second NDI are the same, the transmission to be received by the HARQ process x is a retransmission; conversely, if the values of the first NDI and the second NDI are toggled, the transmission to be received by the HARQ process x is a new transmission.

Similarly, please further refer to FIG. 9. Assume that the pre-assigned SPS transmission is received by the HARQ process x according to the configurations of the SPS functionality at a timing point A5, and timing points C5 and E5 are pre-assigned timing reserved for SPS. When the first NDI addressed to UE's C-RNTI for the HARQ process x is received at a timing point D5, the UE according to the embodiment of the present invention compares the first NDI with the second NDI previously addressed to its C-RNTI for the HARQ process x (e.g. at a timing point B5) to determine whether the transmission to be received by the HARQ process x is a new transmission. If the values of the first NDI and the second NDI are the same, the transmission to be received by the HARQ process x is a retransmission; conversely, if the values of the first NDI and the second NDI are toggled, the transmission to be received by the HARQ process x is a new transmission.

That means, under a situation that the SPS functionality is activated, the embodiment of the present invention only compares the received NDI with the NDI previously addressed to its C-RNTI for the same HARQ process, to avoid unexpected data combination due to incorrect NDI comparison results.

It is noted that, if there does not exist the second NDI addressed to UE's C-RNTI for the HARQ process x at the timing points A4 and B5, the UE shall consider the transmission to be received by the HARQ process x as a very first transmission.

Figure 10:
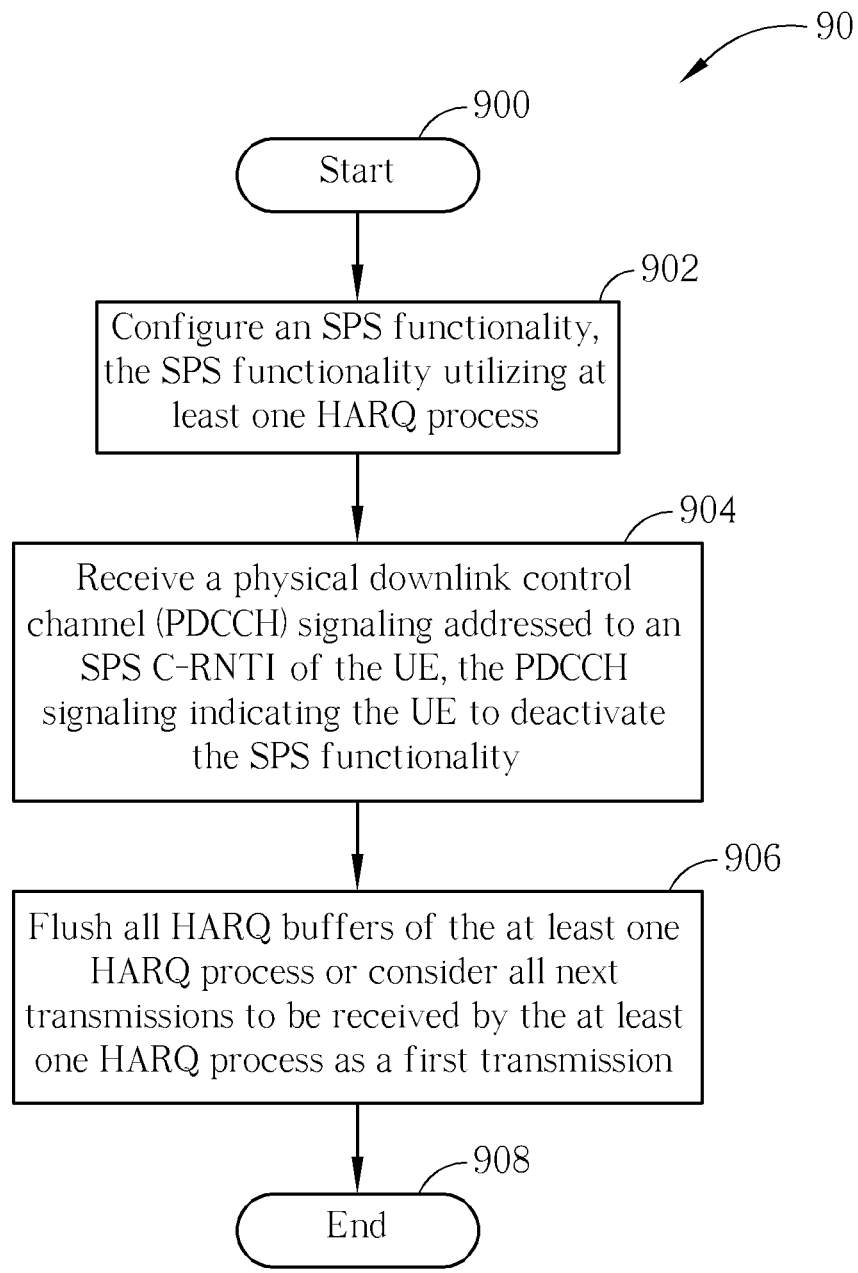
FIG. 10 is a flowchart of a process according to an embodiment of the present invention.

Please refer to FIG. 10, which illustrates a schematic diagram of a process 90 according to an embodiment of the present invention. The process 90 is utilized for handling an HARQ process for SPS in a UE of a wireless communication system and can be compiled into the HARQ process handling program 220. The process 90 includes the following steps:

Step 900: Start.

Step 902: Configure an SPS functionality, the SPS functionality utilizing at least one HARQ process.

Step 904: Receive a physical downlink control channel (PDCCH) signaling addressed to an SPS C-RNTI of the UE, the PDCCH signaling indicating the UE to deactivate the SPS functionality.

Step 906: Flush all HARQ buffers of the at least one HARQ process or consider all next transmissions to be received by the at least one HARQ process as a first transmission.

Step 808: End.

According to the process 90, the embodiment of the present invention first configures the SPS functionality, which utilizes at least one HARQ process. Then, the UE receives PDCCH signaling addressed to its SPS C-RNTI for deactivating the SPS functionality. Accordingly, the UE flushes all HARQ buffers of the at least one HARQ process or considers all next transmissions to be received by the at least one HARQ process as a first transmission.

Therefore, when the PDCCH signaling addressed to UE's SPS C-RNTI for deactivating the SPS functionality is received, the UE shall flushes all HARQ buffers of the HARQ processes reserved for SPS, or consider all next transmissions to be received by the reserved HARQ process as a first transmission, to avoid unexpected data combination due to incorrect NDI comparison.

In short, since the meaning of SPS NDI is different from that of DS NDI, in order to avoid meaningless NDI compassion, the embodiment of the present invention provide four possible solutions: (1) considering a downlink assignment addressed to UE's C-RNTI as a very first transmission of the HARQ process after reception of a downlink assignment addressed to UE's SPS C-RNTI; (2) considering a downlink assignment addressed to UE's C-RNTI as a very first transmission of the HARQ process after a pre-assigned SPS transmission; (3) only comparing the received NDI with the NDI previously addressed to UE's C-RNTI for the same HARQ process; and (4) flushing all HARQ buffers of the HARQ processes reserved for SPS, or considering all next transmissions to be received by the reserved HARQ process as a first transmission when the PDCCH signaling addressed to UE's SPS C-RNTI for deactivating the SPS functionality is received. As a result, the embodiment of the present invention can avoid unexpected data combination due to incorrect NDI comparison results.

As mentioned above, the embodiment of the present invention provides a method of handling the HARQ operation for the SPS functionality, to avoid incorrect data combination and enhance system performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling a hybrid automatic repeat request (HARQ) process for semi-persistent scheduling (SPS) in a user equipment (UE) of a wireless communication system, the method comprising:
   configuring an SPS functionality, the SPS functionality utilizing at least one HARQ process;
   receiving a first new data indicator (NDI) addressed to an SPS cell radio network temporary identifier (SPS C-RNTI) of the UE for a first HARQ process of the at least one HARQ process; and
   considering a next transmission to be received by the first HARQ process as a first transmission of the first HARQ process when receiving a second NDI addressed to a C-RNTI of the UE for the first HARQ process to avoid unexpected data combination due to incorrect NDI comparison.

2. The method of claim 1, wherein the first transmission of the first HARQ process means a new transmission.

3. A communication device of handling a hybrid automatic repeat request (HARQ) process for semi-persistent scheduling (SPS) in a user equipment (UE) of a wireless communication system, the communication device comprising:
   a processor for executing a program; and
   a memory coupled to the processor for storing the program; wherein the program comprises:
   configuring an SPS functionality, the SPS functionality utilizing at least one HARQ process;
   receiving a first new data indicator (NDI) addressed to an SPS cell radio network temporary identifier (SPS C-RNTI) of the UE for a first HARQ process of the at least one HARQ process; and
   considering a next transmission to be received by the first HARQ process as a first transmission of the first HARQ process when receiving a second NDI addressed to a C-RNTI of the UE for the first HARQ process to avoid unexpected data combination due to incorrect NDI comparison.

4. The communication device of claim 3, wherein the first transmission of the first HARQ process means a new transmission.

5. A method of handling a hybrid automatic repeat request (HARQ) process for semi-persistent scheduling (SPS) in a user equipment (UE) of a wireless communication system, the method comprising:
   configuring an SPS functionality, the SPS functionality utilizing at least one HARQ process;
   receiving a pre-assigned transmission by a first HARQ process of the at least one HARQ process according to configurations of the SPS functionality; and
   considering a next transmission to be received by the first HARQ process as a first transmission of the first HARQ process when receiving a new data indicator (NDI) addressed to a Cell Radio Network Temporary Identifier (C-RNTI) of the UE for the first HARQ process to avoid unexpected data combination due to incorrect NDI comparison.

6. The method of claim 5, wherein the first transmission of the first HARQ process means a new transmission.

7. A communication device of handling a hybrid automatic repeat request (HARQ) process for semi-persistent scheduling (SPS) in a user equipment (UE) of a wireless communication system, the communication device comprising:
a processor for executing a program; and
a memory coupled to the processor for storing the program; wherein the program comprises:
configuring an SPS functionality, the SPS functionality utilizing at least one HARQ process;
receiving a pre-assigned transmission by a first HARQ process of the at least one HARQ process according to configurations of the SPS functionality; and
considering a next transmission to be received by the first HARQ process as a first transmission of the first HARQ Process when receiving a new data indicator (NDI) addressed to a Cell Radio Network Temporary Identifier (C-RNTI) of the UE for the first HARQ process to avoid unexpected data combination due to incorrect NDI comparison.

8. The communication device of claim 7, wherein the first transmission of the first HARQ process means a new transmission.

9. A method of handling a hybrid automatic repeat request (HARQ) process for semi-persistent scheduling (SPS) in a user equipment (UE) of a wireless communication system, the method comprising:
configuring an SPS functionality, the SPS functionality utilizing at least one HARQ process;
receiving a physical downlink control channel (PDCCH) signaling addressed to an SPS Cell Radio Network Temporary Identifier (SPS C-RNTI) of the UE, the PDCCH signaling indicating the UE to deactivate the SPS functionality; and
avoiding unexpected data combination due to incorrect NDI comparison by flushing all HARQ buffers of the at least one HARQ process or considering all next transmission to be received by the at least one HARQ process as a first transmission.

10. The method of claim 9, wherein the first transmission means a new transmission.

11. A communication device of handling a hybrid automatic repeat request (HARQ) process for semi-persistent scheduling (SPS) in a user equipment (UE) of a wireless communication system, the communication device comprising:
a processor for executing a program; and
a memory coupled to the processor for storing the program; wherein the program comprises:
configuring an SPS functionality, the SPS functionality utilizing at least one HARQ process;
receiving a physical downlink control channel (PDCCH) signaling addressed to an SPS Cell Radio Network Temporary Identifier (SPS C-RNTI) of the UE, the PDCCH signaling indicating the UE to deactivate the SPS functionality; and
avoiding unexpected data combination due to incorrect NDI comparison by flushing all HARQ buffers of the at least one HARQ process or considering all next transmission to be received by the at least one HARQ process as a first transmission.

12. The communication device of claim 11, wherein the first transmission means a new transmission.

* * * * *